June 9, 1953 P. H. HARRER 2,641,098
HIGH LIFT SIDE DELIVERY RAKE
Filed Nov. 8, 1950 4 Sheets-Sheet 2
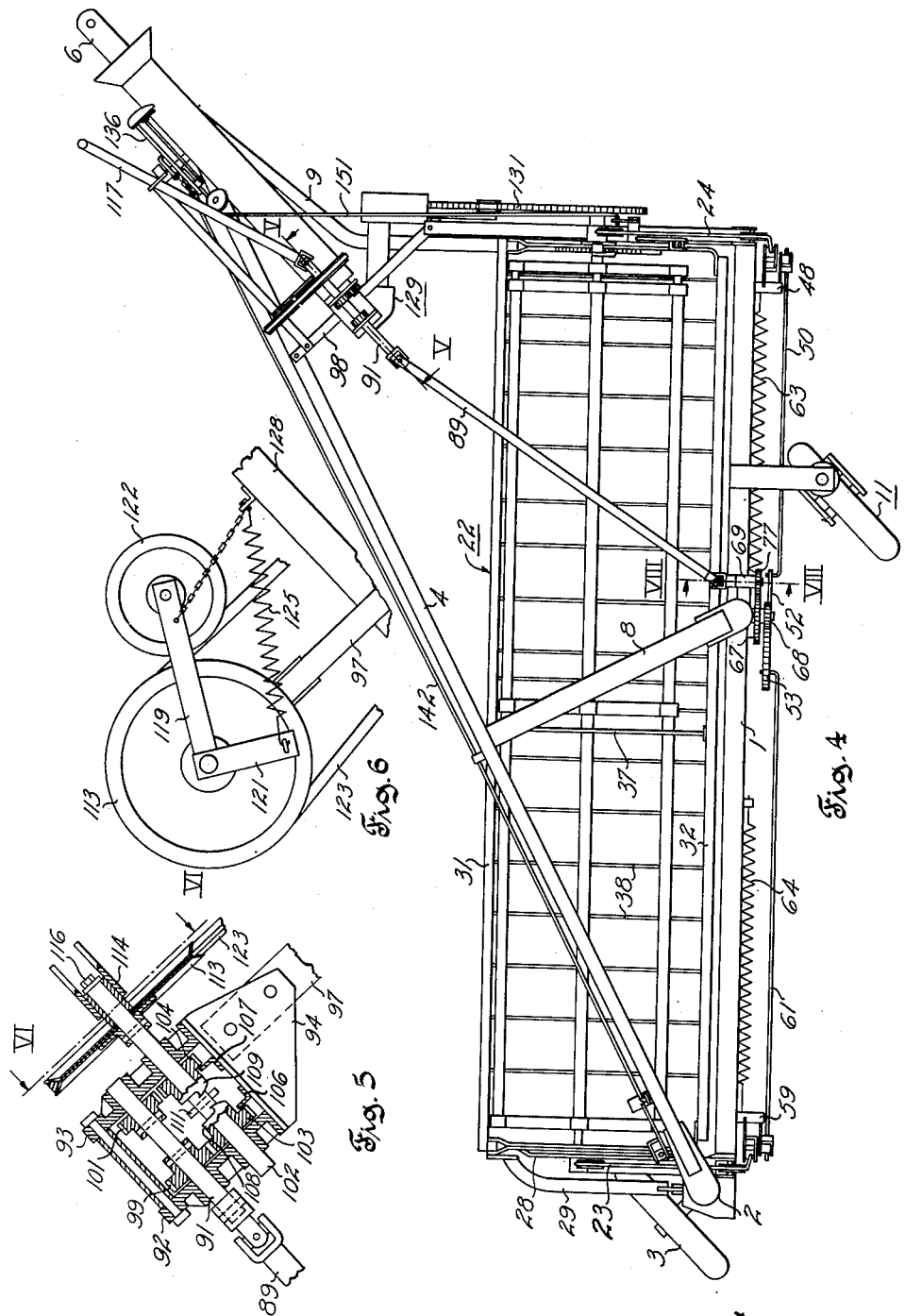
Inventor
Paul H. Harrer
by [signature]
Attorney June 9, 1953 P. H. HARRER 2,641,098
HIGH LIFT SIDE DELIVERY RAKE
Filed Nov. 8, 1950 4 Sheets-Sheet 3

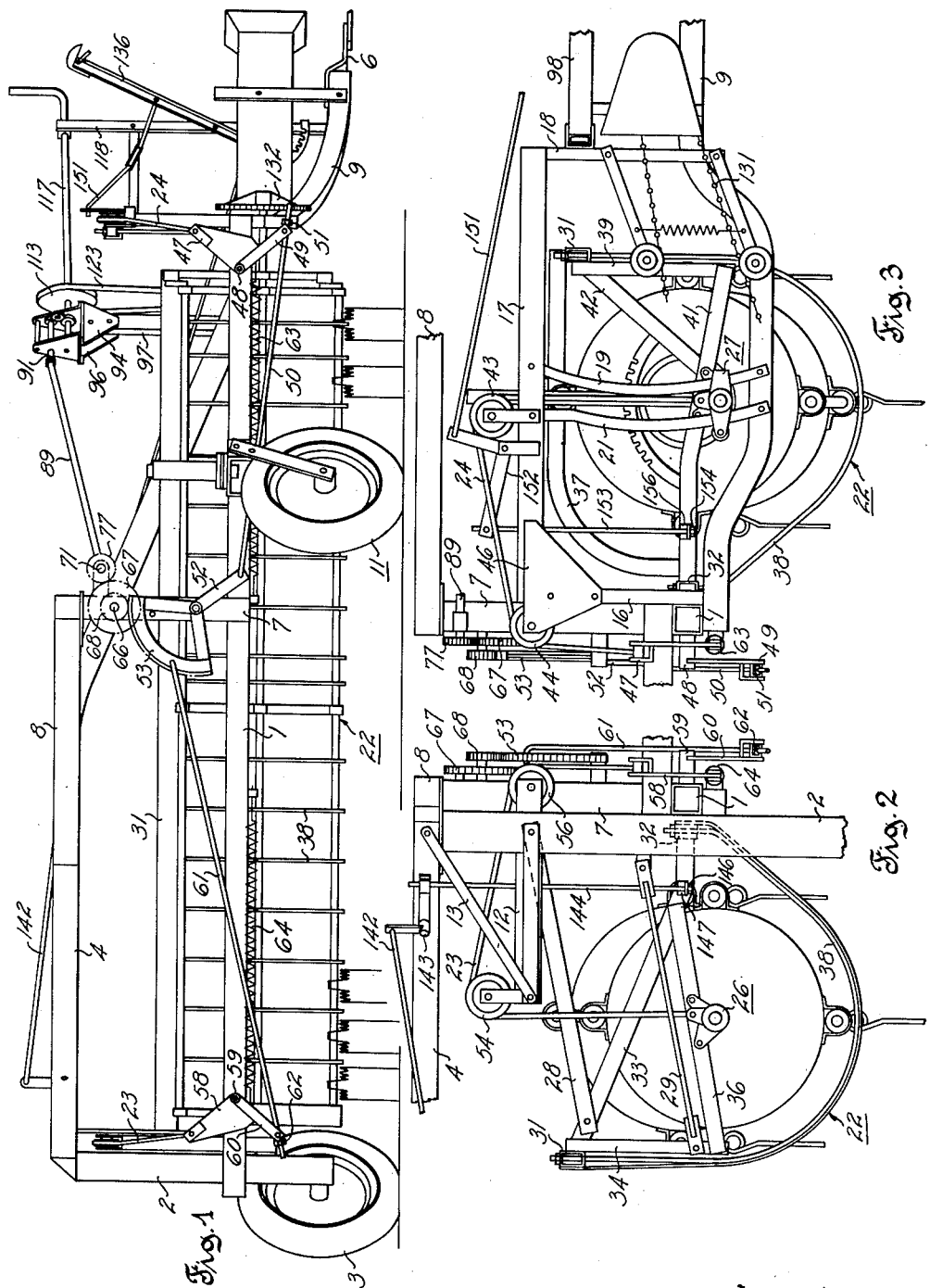

Inventor
Paul H. Harrer
by Kenneth (illegible)
Attorney

Patented June 9, 1953

2,641,098

UNITED STATES PATENT OFFICE 2,641,098

HIGH LIFT SIDE DELIVERY RAKE

Paul H. Harrer, La Porte, Ind., assignor to Allis-Chalmers Manufacturing Company, Milwaukee, Wis.

Application November 8, 1950, Serial No. 194,648

15 Claims. (Cl. 56—27)

This invention relates generally to machines incorporating parts or apparatus requiring adjustment and is more particularly concerned with and contemplates providing machines of this type with an improved mechanism for readily effecting the adjustment of such parts or apparatus.

In the operation of agricultural machines of this type, for example a side delivery rake incorporating a power driven reel and a protecting basket partially enclosing the reel, it is desirable to mount the reel and/or basket for vertical adjustment relative to its supporting frame in order to vary ground clearance and avoid damaging contact with obstructions of a nature encountered in traveling over uneven ground. Sometimes these obstructions occur quite frequently and since the apparatus to be raised or lowered may be rather heavy, it is of advantage to provide an adjusting means which can be readily actuated with a minimum of attention and effort on the part of the operator.

Often an agricultural machine of the type referred to is coupled in trailing relation to a propelling tractor and the power driven part which may or may not include the apparatus mounted for vertical adjustment, is operated through a power transmitting means detachably connected with a power take-off element at the rear of the tractor. Most of the mechanical arrangements heretofore devised for effecting vertical adjustment of such apparatus embody interconnected levers, links and flexible elements including an actuating and positioning lever disposed within easy reach of an operator seated on the propelling tractor and the extent of movement of the reel and basket usually limited to a range within which adequate mechanical advantage for lifting can be obtained whereas, the present arrangement permits wide range of movement with much greater speed than could be secured with prior art devices.

Frequent manipulation of such an actuating lever usually requires considerable effort even though the adjusting mechanism incorporates a balance spring or other means affording the operator some mechanical advantage. This diverts the operator's attention from the tractor and to some extent from those irregularities in the ground surface soon to be traveled. As a result, the tendency is either to drive the tractor at a slow speed affording ample time in which to make the necessary adjustments, or to operate with the apparatus adjusted to afford excessive ground clearance. However, both modes of operation involve an inefficient use of the machine and are therefore objectionable.

It is therefore an object of the present invention to provide an inexpensive mechanical power operated means for adjusting the position of movably mounted machine parts, such means incorporating an improved construction and combination of elements affording ready adjustment with a minimum of attention and effort on the part of the operator.

Another object of this invention is to provide an improved mechanical power operated adjusting means of the type above mentioned wherein elements are combined for coaction in a manner affording ready adjustment without affecting the operation of power driven parts.

Another object of this invention is to provide means for leveling a raking reel and basket relative to the ground and wherein such means are actuated by a single control lever.

Another object of this invention is to provide means for guiding a raking reel and basket when the reel and basket are being raised or lowered substantial amounts.

Another object of this invention is to provide improved means for guiding a raking reel and basket when being raised or lowered and which means reduces the amount of friction and binding usually found in such means.

Accordingly, the present invention may be considered as comprising the various features of construction and combination hereinafter more particularly set forth in the appended claims and in the following detailed description, reference being had to the accompanying drawings, in which:

Fig. 1 is a rear elevation of a side delivery rake embodying the invention;

Fig. 2 is a side elevation of the left side of the rake shown in Fig. 1 illustrating the adjustable mounting of the reel and basket;

Fig. 3 is a side elevation of the right side of the rake shown in Fig. 1 with the reel drive sprocket removed for sake of clarity;

Fig. 4 is a plan view of the rake shown in Fig. 1;

Fig. 5 is an enlarged view taken on line V—V of Fig. 4;

Fig. 6 is an enlarged view taken on line VI—VI of Fig. 5;

Figure 7:
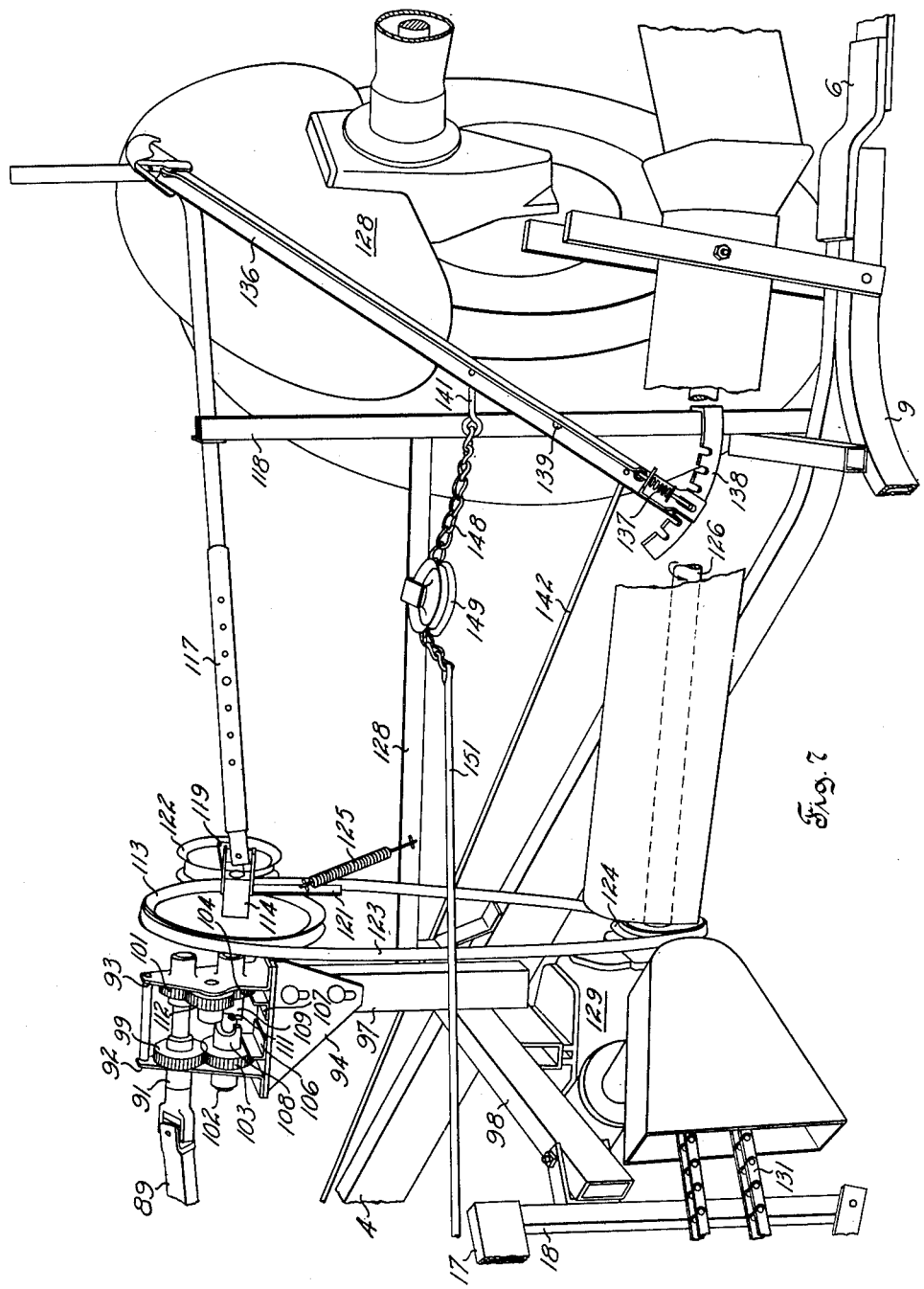
Fig. 7 is a perspective view showing the basket and reel control means.

Referring to the drawings, it is seen that a side delivery rake embodying the invention may include a reel and basket mounting frame structure including a rear tubular beam 1 joined at one end thereof to a vertical tube member 2 which is supported on a fixed direction wheel 3; an arched frame member 4 which is joined at the rear end thereof to the top of vertical tube member 2 and which extends diagonally forwardly over the rake structure and terminates in a hitch portion 6; a vertical tube member 7 joined at its lower end to a midportion of rear beam 1 and having a diagonally horizontally extending upper portion 8 extending over the rake and joined to a midportion of arched frame member 4; a forwardly extending frame member 9 joined to the right end of rear tubular beam 1 and to the forward end of arched member 4 to form the hitch part 6; a caster wheel structure 11 attached to rear tubular beam 1 in supporting relation thereto; horizontally extending frame member 12 (see Fig. 2) which is attached at one end to vertical tube member 2 and which is additionally braced from tube member 2 by means of a brace 13; and a vertically extending tube member 16 (see Fig. 3) attached at its lower end to the right end of rear tubular beam 1 and with its upper end attached to a horizontally extending frame member 17 which is supported at its forward end from frame member 9 by means of a tube member 18 and reel guide members 19 and 21 which are attached to and extend between frame member 17 and frame member 9.

The basket and reel structure 22 is supported from the main frame structure by means of flexible cables 23 and 24 which are attached to reel bearing structures 26 and 27, respectively, located at opposite ends of the reel structure. A pair of substantially parallel stabilizing links 28 and 29 (see Fig. 2) are pivotally attached to vertical tube 2 and at the other ends thereof are pivotally attached to the reel and basket structure 22 and as can be readily seen in Fig. 2 these two stabilizing links provide a parallel linkage which governs the path followed by the left end of the basket and reel assembly 22 when being raised or lowered. It is to be noted that link 28 is positioned with its width portion lying in a vertical plane whereas, link 29 has its width portion lying in a plane normal to a vertical plane. Links 28 and 29 serve to stabilize the basket and reel structure from horizontal displacement when rough or uneven ground is encountered and to resist rotational movement of the basket which may be occasioned by the basket contacting an unusually large windrow.

The basket and reel structure 22 comprises parallel front and rear tubular beams 31 and 32, respectively, having their left hand end portions interconnected by a triangular frame (see Fig. 2) including a generally horizontal extending strap member 33 extending between beams 31 and 32, a vertical tube member 34 attached at its upper end to beam 31 and attached at its lower end to a strap member 36 which is connected at its other end to a midportion of strap 33. The left hand end of stabilizing element 28 (as viewed in Fig. 2) is pivotally attached to strap 33 and the left hand end of stabilizing element 29 is pivotally attached to tube 34 and the paths followed by the left hand ends of elements 28 and 29 define the path followed by the left hand end of the reel basket when it is being raised or lowered.

The midportion of front and rear tubular beams 31 and 32 are interconnected by an arched brace member 37 (see Fig. 4) and longitudinally spaced opposed portions of tubular beams 31 and 32 are interconnected by reel basket forming stripper bars 38. The right end portions of tubular beams 31 and 32 (see Fig. 3) are interconnected by a triangular structure including a vertically extending member 39 joined to tubular member 31 and depending therefrom, a generally horizontally extending brace member 41 attached between the lower end of vertical tube member 39 and tubular frame member 32 and a brace member 42 connected between a midportion of horizontal member 41 and the upper end of vertical tube member 39.

The reel is journaled at its ends in bearing structures 26 and 27. Right hand bearing 27 is attached to an end of flexible cable 24 and to cross member 41 and is guided when being raised and lowered by bearing guides 19 and 21. Cable 24 is supportingly guided by pulleys 43 and 44 carried by frame member 17 and gusset plate 46, respectively, which plate joins frame member 17 to vertical member 16. Cable 24 is pivotally connected at its other end to one arm 47 of a bell crank 48 pivotally carried by tubular frame member 1. The other arm 49 of bell crank 48 pivotally and slidably receives a rod 50 having a stop element 51 on the end thereof providing a lost motion connection between rod 50 and arm 49. The other end of rod 50 is pivotally connected to an arm 52 attached to a gear quadrant 53 pivotally carried by vertical tube 7. Left hand bearing 26 is attached to an end of flexible cable 23 and to cross member 36 and is guided when being raised or lowered by parallel links 28 and 29. Cable 23 is supportingly guided by pulleys 54 and 56 operatively carried by frame member 12. Cable 23 is connected at its other end to one arm 58 of a bell crank 59 pivotally carried by tubular frame member 1. The other arm 60 of bell crank 59 pivotally and slidably receives a rod 61 having a stop element 62 on the end thereof providing a lost motion connection between rod 61 and arm 60. Rod 61 is pivotally attached at its other end to gear quadrant 53. The points of attachment of rods 50 and 61 being such that as the gear quadrant is rotated bell cranks 48 and 59 are actuated to pivot and simultaneously raise or lower the basket reel structure 22 the same amounts at either end thereof. Counterbalancing means for partially offsetting the weight of the reel basket structure is provided in the form of springs 63 and 64 which are attached at one end to frame member 1 and are attached at the other ends thereof to lower portions of bell crank arms 47 and 58, respectively. As a result of these counterbalancing springs, much less force is required to lift the reel and basket structure 22.

Figure 8:
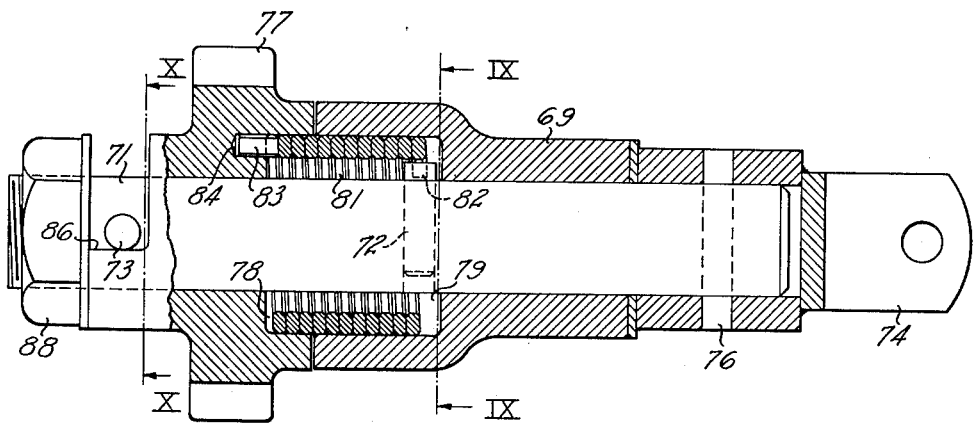
Fig. 8 is section view taken on line VIII—VIII of Fig. 4.
Figure 10:
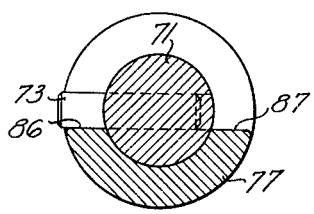
Fig. 10 is a section view taken on X—X of Fig. 8.
Figure 9:
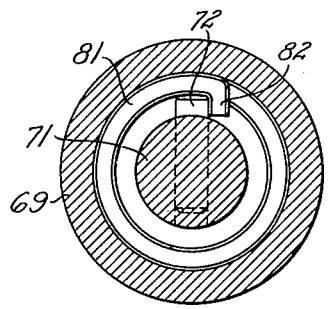
Fig. 9 is a section view taken on IX—IX of Fig. 8.

A shaft 66 (see Fig. 1) is rotatably journaled in tube member 7 and has attached thereto a pair of gears 67 and 68, the latter gear meshing with quadrant gear 53 for driving same. A housing member 69 (see Figs. 4 and 8) is attached to vertical tube 7 and rotatably supports a shaft 71 having a pair of pins 72 and 73 radially extending therefrom. The right hand end of shaft 71 (as viewed in Fig. 8) has a universal joint element 74 attached thereto by means of a pin 76 with element 74 abutting against housing member 69. A gear 77 meshing with gear 67 is rotatably supported on shaft 71 and includes a hollowed out right hand hub portion 78 abutting a complementary hollowed out left hand hub portion 79 of housing 69. A spring 81 encircling shaft 71 is constructed so that it is normally pressing against the hollowed out portions of 78 and 79 of gear 77 and housing 69, respectively. The right hand end of spring 81 has a hook portion 82 which is engageable with pin 72 as is indicated in Fig. 9 while the left hand end of spring 81 has a longitudinally extending portion 83 which is seated in a hole 84 drilled in gear 77. The left end portion of gear 77 has a semicircular portion thereof removed within which pin 73 is received as is indicated in Fig. 10, providing a half turn relative movement between gear 77 and shaft 71 and providing two radial surfaces 86 and 87 which are contactable by pin 73 to provide a driving connection between shaft 71 and gear 77. Gear 77 is maintained on shaft 71 by means of a jam nut 88 engaged with threads on the left end of shaft 71 and which jam nut keeps gear 77 in contact with housing 69. The function of this assembly will be described at a later part of this specification.

A shaft 89 (see Fig. 4) is connected at one end to universal element 74 and at the other end is universally connected to a shaft 91 journaled in plates 92 and 93 (see Fig. 7) carried by gusset plates 94 and 96 which are attached to vertical member 97 carried by cross frame member 98 which extends between a forward portion of frame member 4 and vertically extending frame member 18.

Shaft 91 has gears 99 and 101 (see Fig. 7) attached thereto for rotation therewith. A shaft 102 is slidably journaled in plates 92 and 93 and rotatably supports thereon a pair of gears 103 and 104 which are prevented from moving along shaft 102, when the same is slid, by means of angle irons 106 and 107 which are attached to gusset plates 94 and 96. The opposed hubs 108 and 109 of gears 103 and 104, respectively, each have notches therein adapted to receive the ends of pin 111 extending through shaft 102. An idler gear 112 is rotatably supported on plate 93 and is meshed with gears 101 and 104. Attached to and adjacent the forward end of slidable shaft 102 is a pulley 113 and the forward end of shaft 102 rotatably supports hub 114 which at its rear end abuts pulley 113 and which at its forward end is retained on shaft 102 by conventional means such as nut 116 and a washer (see Fig. 5). Universally attached to hub 114 is a control rod 117 slidably supported in tubular member 118 carried by frame member 4. A pair of arms 119 and 121 are also attached to hub member 114. An idler pulley 122 is rotatably attached to the end of arm 119 in vertical alignment with pulley 113 (see Fig. 6). A belt 123 passes around pulley 113 and pulley 124 attached on power shaft 126. A spring 125 attached at one end thereof to cross bar 128 carried by tube 98 and tube 118 is attached at its other end to arm 121 and biases same in such a direction that idler pulley 122 is normally kept out of contact with belt 123. Under these conditions belt 123 has slack enough therein so that despite the fact that power shaft 126 is driving pulley 124, belt 123 is not driven thereby.

The manner in which the reel is driven by the power take-off (not shown) of tractor 128 (see Fig. 7) is similar to the manner in which the reel is driven in the patent to Fergason, U. S. 2,476,183 and reference to that disclosure can be had for further details. Briefly, power shaft 126 which is driven by the tractor power take-off (not shown) is operatively connected through a gear box 129 and other suitable drive connections to drive chain 131 which is drivingly connected to a sprocket 132 attached to the reel. The reel is provided with the same eccentric means for varying the positions of the tines as is shown in the Fergason patent previously referred to.

To lower the basket and reel assembly 22, rod 117 should be slid rearwardly until pin 111 on shaft 102 is engaged within the notch in the hub 108 of gear 103. The handle on rod 117 is then turned clockwise (as viewed in Fig. 7) against the bias of spring 125 until idler pulley 122 has sufficiently engaged belt 123 to cause same to be driven by pulley 124 and in turn to drive pulley 113 which will then drive gears 103 and 99, shaft 91 and shaft 89 which will drive shaft 71 in a clockwise direction as indicated in Fig. 9. As shaft 71 turns in a clockwise manner as viewed in Fig. 9 pin 72 contacts the hooked end 82 of spring 81 prior to pin 73 contacting the radial surface 87 of gear 77. During the period while pin 73 is moving up to contact surface 87, spring 81 is being wound tight by pin 72 and when pin 73 contacts surface 87, spring 81 in being wound up has been freed of its frictional contact with the inner surface of housing 69 and thereby permits gear 77 to be freely turned by shaft 71.

Gear 77 then drives shaft 66 to which pinion gear 68 is attached in driving relation to gear quadrant 53. Gear quadrant 53 is driven by gear 68 in a counterclockwise direction as viewed in Fig. 1 and rods 50 and 61 are extended outwardly towards the ends of the rake. The ends of rods 50 and 61 tend to slide through the connections with bell crank arms 49 and 60, respectively, but the unbalanced weight of the reel and basket will ordinarily cause bell crank arms 49 and 60 to follow the stop connections 51 and 62 on the ends of rods 50 and 61, respectively. As bell cranks 59 and 48 thus pivot clockwise and counterclockwise, respectively, slack is furnished cables 23 and 24 and the unbalanced weight of the reel and basket cause the same to descend.

When basket and reel assembly 22 has been lowered to the desired height, handle 117 is released and the bias of spring 125 will move idler pulley 122 out of contact with belt 123 and thereby provide sufficient slack in belt 123 so that pulley 113 and its associated driven mechanism are no longer driven by belt 123. When the motion of shaft 71 ceases the weight of the basket and reel assembly 22 which is not supported by counterbalancing springs 63 and 64 causes a continuation of the clockwise rotation of gear 77 until such rotation of gear 77 relative to shaft 71 has caused spring 81 to unwind against the inner surface of housing 69 to provide sufficient friction to prevent relative movement between gear 77 and housing 69.

To raise the basket and reel assembly 22, handle 117 is pulled forwardly until pin 111 in shaft 102 is slid into the notch in the hub 109 of gear 104. Handle 117 is then turned in a clockwise direction, as viewed in Fig. 7, until idler pulley 122 sufficiently engages belt 123 to cause a driving connection between pulleys 113 and 124 which in turn rotates shaft 102 and gear 104 connected thereto. Gear 104 through idler gear 112 drives gear 101 which is attached to shaft 91 and its associated power transmitting means resulting in a driving of shaft 71 in a counterclockwise direction as viewed in Fig. 9. As shaft 71 rotates, pin 73 (see Fig. 10) is in contact with radial surface 86 of gear 77 and rotates this gear in a counterclockwise direction which causes spring 81 to be wound up until the frictional force between spring 81 and housing 69 is decreased to a point where spring 81 rotates with shaft 71. This rotation of gear 77 is transmitted to shaft 66 by means of gear 67 and shaft 66 drives gear 68 which is meshed with quadrant 53 driving same in a counterclockwise direction (as viewed in Fig. 1). This movement of gear quadrant 53 exerts a pull on bell crank arms 49 and 60 through rods 50 and 61, respectively, resulting in a pivoting of bell cranks 48 and 59 which in turn exerts a pull on cables 24 and 23 raising the reel and basket assembly 22. When reel and basket assembly 22 has been raised to a desired height, idler pulley 122 is disengaged from belt 123 by releasing the pressure on handle 117. This results in the stopping of pulley 113 and its associated power transmitting mechanisms. When shaft 102 ceases rotation the unbalanced weight of the basket and reel assembly 22 causes gear 77 to rotate for a partial revolution in a clockwise direction which causes spring 81 to unwind and establish itself against housing 69 and thereby prevent relative rotation of gear 77 to housing 69. This means for locking the raising and lowering mechanism in any position has proven very advantageous as it is positive, simple and operates automatically.

The embodiment of this invention also is provided with means for leveling the basket and reel. As is sometimes the case, it is necessary to operate a rake with one of the supporting wheels lower than the other (such as when operating a rake with one wheel in a dead furrow or irrigation ditch). Means are provided for leveling the reel and basket by the adjustment of a single lever 136 positioned adjacent the operator's seat (not shown) on the tractor 128 operating the rake. Referring to Fig. 7 it can be seen that lever 136 is pivotally attached at a lower midportion thereof to vertical tubular member 118. The upper end of lever 136 is provided with an operating handle for controlling a spring loaded detent 137 which is positionable in a number of slots in arcuate member 138 carried by tubular member 118. At equal distances from pivot point 139, rod members 141 and 142 are pivotally attached to lever 136 so that as the lever 136 is pivoted in either direction equal and opposite forces are applied to rods 141 and 142. Rod 142 is pivotally attached at its rear end to one arm of a bell crank 143 pivotally carried by frame member 4. The other arm of bell crank 143 is pivotally attached to vertically extending rod 144 which has an enlargement 146 on the lower end thereof. A flange 147 on basket frame member 33 has a hole (not shown) through which the rod is slidably received and which hole is of less diameter than enlargement 146.

Rod 141 is pivotally connected at its rear end to a chain 148 which passes around a pulley 149 carried by cross member 128. Chain 148 is pivotally connected at its other end to a rod 151 having a pivotal connection with one arm of a bell crank 152 carried by frame member 17. The other arm of bell crank 152 is pivotally connected with a vertical rod 153 having an enlargement 154 on the other end thereof. Basket member 41 has a flange 156 thereon with a hole therein (not shown) through which rod 153 can slide but which hole is of less diameter than enlargement 154.

It will be noted that the only time this leveling means is operative is when the basket and reel have been lowered to substantially their normal raking position. When the reel and basket are being raised to their transport position or being lowered flanges 147 and 156 merely slide over vertical rods 144 and 153, respectively, until the desired position of the reel and basket structure 22 is obtained, or until enlargements 146 and 154 are contacted by flanges 147 and 156, respectively.

Assuming that the reel and basket 22 have been lowered to an operating position with flanges 147 and 156 resting on enlargements 146 and 154, respectively, but with the rods 50 and 61 moved to their extreme basket lowering position, the stop members 51 and 62 on rods 50 and 61, respectively, would be spaced from the ends of bell crank arms 49 and 60, respectively, and the unbalanced weight of the basket and reel would be carried by the enlargements 146 and 154. Now if the right hand side of the rake is lower than the left, then lever 136 should be pulled forward, this will cause the right hand side of the reel and basket 22 to be raised and the left hand side to be lowered equal amounts until stop member 62 on the end of rod 61 is contacted by bell crank arm 60 from which point on only the right hand end of the reel basket will be raised without a corresponding lowering of the left hand end. To raise the left hand end of the reel and basket, lever 136 should be pushed rearwardly and this will cause the left hand side of the rake to be raised and the right hand side to be lowered equal amounts until stop member 51 on the end of rod 50 is contacted by bell crank arm 49 from which point on only the left hand end of the reel and basket will be raised without a corresponding lowering of the right hand end.

If the rods 50 and 61 have not been moved to their extreme basket lowering position but only sufficient so that reel and basket 22 are partially supported on flanges 147 and 156 and the right hand side of the reel and basket assembly 22 is low, then if lever 136 should be pulled forward, this will cause rod 151 to move bell crank 152 in a clockwise direction as viewed in Fig. 3 and thereby lifting rod 153 which would cause enlargement 154 to contact flange 156 and raise the right hand end of the reel and basket. As the reel and basket raises the slack created in cable 24 is taken up by spring 63 pivoting bell crank 48 in a counterclockwise direction as viewed in Fig. 1 and bell crank arm 49 merely slides over rod 50 as this is a lost motion connection between rod 50 and bell crank arm 49. While the right hand side of the reel and basket are being raised, the left hand side will remain stationary. And if the left hand side of the reel and basket is lower, the opposite procedure is followed including the pushing of lever 136 rearwardly resulting in the raising of the left end of the reel and basket assembly while the right end remains stationary, the specific detail for accomplishing which will not be here stated as they are so similar to those recited in describing the raising of the right end of the reel and basket assembly.

It is not desired to limit the invention to the exact construction and arrangement of parts herein disclosed as various modifications within the scope of the appended claims may occur to persons skilled in the art.

It is claimed and desired to secure by Letters Patent:

1. In a machine including apparatus mounted for adjustment between predetermined limiting positions and a power transmitting means drivingly connected with parts of said machine, an improved adjusting mechanism comprising means actuable to move said apparatus between said limiting positions, said actuable means including parts coacting to maintain said apparatus in any selected position of adjustment, gearing connected with said actuable means and being selectively operable to move said apparatus in opposite directions between said limiting positions, means for connecting said power transmitting means in operative driving relation to selective portions of said gearing including an element biased to an inoperative power transmitting position, and an actuator operatively associated with said element and gearing and being mounted for reciprocable movement in two different directions, movement in one direction effecting a driving connection between said element and a selected portion of said gearing, and movement in the other direction effecting a driving connection between said power transmitting means and said element without disturbing the driving connection between said element and gearing.

2. In a machine including apparatus mounted for adjustment between predetermined limiting positions and a power transmitting means drivingly connected with parts of said machine, an improved adjusting mechanism comprising means actuable to move said apparatus between said limiting positions, said actuable means including parts coacting to maintain said apparatus in any selected position of adjustment, gearing connected with said actuable means and being selectively operable to move said apparatus in opposite directions between said limiting positions, means for connecting said power transmitting means in operative driving relation to selective portions of said gearing including a first element shiftable to a neutral position relative to said gearing and a second element shiftable relative to said first element from an inoperative position to a position wherein said power transmitting means is drivingly connected with said first element, biasing means acting to maintain said second element in its said inoperative position, and an elongated actuator operatively associated with said elements and being mounted for reciprocable movement in two different directions, movement in one direction establishing a driving connection between said first element and a selected portion of said gearing, and movement in the other direction establishing a driving connection between said power transmitting means and said first element without disturbing the driving connection between said first element and the selected portion of said gearing.

3. In a machine including apparatus mounted for adjustment between predetermined limiting positions and a power transmitting means drivingly connected with parts of said machine, an improved adjusting mechanism comprising means actuable to move said apparatus between said limiting positions, said actuable means including parts coacting to maintain said apparatus in any selected position of adjustment, reversible gearing connected with said actuable means and being selectively operable to move said apparatus in opposite directions between said limiting positions, an elongated actuator mounted for both linear and angular movement relative to said gearing and comprising a main portion and a shaft section movable linearly with said main portion and supported for rotation relative thereto, said shaft section carrying a part movable therewith and being operatively associated with said gearing to establish a driving connection between said shaft section and a selected portion of said gearing in response to linear movement of said actuator, and means for selectively establishing a driving connection between said shaft section and power transmitting means including an element carried by said main portion of said actuator and movable angularly therewith into and out of a position establishing said driving connection.

4. In a machine including apparatus mounted for adjustment between predetermined limiting positions and a power transmitting means drivingly connected with parts of said machine, an improved adjusting mechanism comprising means actuable to move said apparatus between said limiting positions, said actuable means including parts coacting to maintain said apparatus in any selected position of adjustment, reversible gearing connected with said actuable means and being selectively operable to move said apparatus in opposite directions between said limiting positions, means for connecting said power transmitting means in operative driving relation to selective portions of said gearing including an elongated actuator mounted for both linear and angular movement relative to said gearing and comprising a main portion and a shaft section movable linearly with said main portion and supported for rotation relative thereto, said shaft section carrying a part movable therewith and being operatively associated with said gearing to establish a driving connection between said shaft section and a selected portion of gearing in response to linear movement of said actuator, a pulley fixedly mounted on said shaft section for movement therewith, said power transmitting means including a pulley disposed in alignment and loosely belt-connected with the pulley on said shaft section, and a belt tightener carried by said main portion of said actuator in position to establish a driving connection between said pulley in response to an angular movement of said actuator.

5. In a machine including apparatus mounted for adjustment between predetermined limiting positions and a power transmitting means drivingly connected with parts of said machine, an improved adjusting mechanism comprising means actuable to move said apparatus between said limiting positions, said actuable means including parts coacting to maintain said apparatus in any selected position of adjustment, reversible gearing connected with said actuable means and being selectively operable to move said apparatus in opposite directions between said limiting positions, an elongated actuator mounted for both linear and angular movement relative to said gearing and comprising a main portion and a shaft section movable axially therewith and supported for rotation relative thereto, said shaft section carrying a part movable therewith and being operatively associated with said gearing to establish a driving connection between said shaft section and a selected portion of said gearing in response to a linear movement of said actuator in either direction from an intermediate neutral position, means for selectively establishing a driving connection between said shaft section and power transmitting means including an element carried by said actuator for movement therewith, said element being operative to establish said driving connection in response to an angular movement of said actuator, and biasing means acting to maintain said element in an inoperative power transmitting position.

6. In a machine including apparatus mounted for adjustment between predetermined limiting positions and a power transmitting means drivingly connected with parts of said machine, an improved adjusting mechanism comprising means actuable to move said apparatus between said limiting positions, said actuable means including parts coacting to maintain said apparatus in any selected position of adjustment, reversible gearing connected with said actuable means and being selectively operable to move said apparatus in opposite directions between said limiting positions, means for connecting said power transmitting means in operative driving relation to selected portions of said gearing including an elongated actuator mounted for both linear and angular movement relative to said gearing and comprising a main portion and a shaft section movable linearly with said main portion and supported for rotation relative thereto, said shaft section carrying a part movable therewith and being operatively associated with said gearing to establish a driving connection between said shaft section and a selected portion of gearing in response to linear movement of said actuator, a pulley fixedly mounted on said shaft section for movement therewith, said power transmitting means including a pulley disposed in alignment and loosely belt-connected to the pulley on said shaft section, a belt tightener carried by said main portion of said actuator in position to establish a driving connection between said pulley in response to an angular movement of said actuator, and biasing means acting to maintain said tightener in an inoperative position relative to said belt.

7. In a side delivery rake including a mobile frame structure having means mounting a rotary tine carrying reel and a reel protecting basket for limited guided vertical movement relative to said frame structure between limiting positions as determined by said mounting means, and including a power transmitting means drivingly connected with said reel, an improved supporting and adjusting mechanism for said basket and reel comprising suspension means including actuating parts coacting to vertically move the opposite ends of said basket and reel simultaneously relative to said mounting means and to maintain said basket and reel in any selected position of adjustment, said suspension means also including flexible elements affording further upward movement of said basket and reel relative to any selected position of adjustment other than its uppermost limiting position, reversible gearing connected with said actuating parts and being selectively operable to move said basket and reel in opposite directions between said limiting positions, means for connecting said power transmitting means in operative driving relation to said gearing including an elongated actuator mounted on said frame structure for both linear and angular movement relative to said gearing and comprising a main portion and a shaft section movable linearly with said main portion and supported for rotation relative thereto, said shaft section carrying a part movable therewith and being operatively associated with said gearing to establish a driving connection between said shaft section and selected elements of said gearing in response to linear movement of said actuator, a pulley fixedly mounted on said shaft section for movement therewith, said power transmitting means including a pulley disposed in alignment and loosely belt-connected to the pulley on said shaft section, a belt tightener carried by said main portion of said actuator in position to establish a transmission of power between said pulleys in response to an angular movement of said actuator, and biasing means acting to maintain said tightener in an inoperative position relative to said belt.

8. In a side delivery rake including a mobile frame structure having means mounting a rotary tine carrying reel and a reel protecting basket for limited guided vertical movement relative to said frame structure between limiting positions as determined by said mounting means, and including a power transmitting means drivingly connected with said reel, an improved supporting and adjusting mechanism for said basket and reel comprising suspension means including actuating parts coacting to vertically move the opposite ends of said basket and reel simultaneously relative to said mounting means and to maintain said basket and reel in any selected position of adjustment, said suspension means also including flexible elements affording further upward movement of said basket and reel relative to any selected position of adjustment other than its uppermost limiting position, reversible gearing connected with said actuating parts and being selectively operable to move said basket and reel in opposite directions between said limiting positions, means for connecting said power transmitting means in operative driving relation to said gearing including a first element shiftable to a neutral position relative to said gearing and operatively associated therewith to establish a driving connection between said first element and a selected portion of said gearing, a second element shiftable angularly relative to said first element from an inoperative position to a position wherein said power transmitting means is drivingly connected with said first element, biasing means acting to maintain said second element in its said inoperative position, and an elongated actuator operatively associated with said elements and being mounted for both linear and angular movement relative to said gearing, linear movement of said actuator establishing a driving connection between said first element and a selected portion of said gearing, angular movement of said actuator establishing a driving connection between said power transmitting means and first element without disturbing the driving connection between said first element and the selected portion of said gearing.

9. Mechanism for selectively controlling the transmission of power between driving and driven elements and the direction of rotation of the driven element comprising: gearing connected with the driven element and being selectively operable to rotate said driven element in different directions, an elongated controller supported for both linear and angular movement relative to said gearing and including a main portion and a shaft section movable linearly with said main portion and supported for rotation relative thereto, said shaft section carrying a part movable therewith and being operatively associated with said gearing to establish a driving connection between said shaft section and a selected portion of said gearing in response to linear movement of said controller, a first pulley fixed on said shaft section for movement therewith, a second pulley fixed on said driving element for movement therewith and loosely belt-connected with said first pulley, a belt tightener carried by said main portion of said controller in position to establish a transmission of power between said pulleys in response to an angular movement of said controller, and biasing means acting to maintain said tightener in an inoperative position relative to said belt.

10. Mechanism for selectively controlling the transmission of power between driving and driven elements and the direction of rotation of the driven element comprising: gearing connected with the driven element and being selectively operable to rotate said driven element in different directions, a first element mounted for rotation adjacent said gearing and being axially shiftable relative thereto, said first element carrying a part movable therewith and operative to establish a driving connection between said first element and a selected portion of said gearing in response to axial movement of the former, a second element carried by said first element to move axially therewith and being shiftable angularly relative thereto, a controller operatively connected with said second element to effect a simultaneous axial movement of both elements and an angular movement of said second element relative to said first element, and means for effecting a power transmitting connection between said driving and first elements including a part movable angularly with said second element into and out of a position establishing said power transmitting connection.

11. Mechanism for selectively controlling the transmission of power between driving and driven elements and the direction of rotation of the driven element comprising: gearing connected with the driven element and being selectively operable to rotate said driven element in different directions, an elongated controller mounted for both linear and angular movement relative to said gearing and including a shaft section supported for rotation relative thereto, said shaft section carrying a part movable therewith and being operatively associated with said gearing to establish a driving connection between said shaft section and a selected portion of said gearing in response to linear movement of said controller, and means for selectively establishing a power transmitting connection between said shaft section and said driving element and including a member carried by said controller and movable angularly therewith into and out of a position establishing said power transmitting connection.

12. In combination in a side delivery rake having a wheel supported frame, a reel and basket assembly mounted on and adjustable as a unit in raising and lowering directions relative to said frame, and apparatus for raising one end of said reel and basket assembly relative to said frame while lowering the other end of said assembly, said apparatus including a lever pivotally mounted at a center portion thereof on said frame and presenting radially outer portions spaced from each other circumferentially about said center portion, load transmitting means operatively interposed between one of said radially outer portions of said lever, and one end of said reel and basket assembly, and other load transmitting means operatively interposed between the other of said radially outer portions of said lever and the other end of said reel and basket assembly, whereby movement of said lever in one direction about its pivotal connection with said frame raises one end of said reel and basket assembly while simultaneously lowering the other end thereof, and whereby movement of said lever in the opposite direction lowers said one end of said reel and basket assembly while simultaneously raising said other end thereof.

13. In combination in a side delivery rake including a main frame, a reel and basket assembly mounted on and adjustable as a unit in raising or lowering directions relative to said main frame, and apparatus for selectively raising or lowering either end of said reel and basket assembly relative to said main frame, said apparatus including a lever having a horizontal pivot axis on said main frame and presenting upper and lower radially outer portions movable, respectively, on arcs above and below said pivot axis, load transmitting means operatively interposed between said upper portion of said lever and one end of said reel and basket assembly, and other load transmitting means operatively interposed between said lower portion of said lever and the other end of said reel and basket assembly.

14. In combination in a side delivery rake having a wheel supported frame, a reel and reel basket assembly mounted on and adjustable as a unit in raising and lowering directions relative to said frame, and means for guiding at least one end of said reel and basket assembly during raising and lowering of the latter, said means comprising a pair of vertically spaced parallel links, means pivotally mounting each of said links at one of its ends on said rake frame, and means pivotally mounting each of said links at the other of its ends to vertically spaced apart portions of said one end of said reel and basket.

15. In combination in a side delivery rake having a wheel supported frame, a reel and reel basket assembly mounted on and adjustable as a unit in raising and lowering directions relative to said frame, and means for guiding at least one end of said reel and basket assembly during raising and lowering of the latter, said means comprising an upper and a lower link pivotally secured on upper and lower pivot centers, respectively, to said frame, and upper and lower pivot means connecting said upper and lower links, respectively, with one end of said reel and basket assembly at points spaced radially from said upper and lower pivot centers and vertically from each other, one of said links having its width portion lying in a vertical plane and the other of said links having its width portion lying in a plane normal to a vertical plane.

PAUL H. HARRER.

References Cited in the file of this patent

UNITED STATES PATENTS

| Number | Name | Date |
|---|---|---|
| 471,648 | Mann | Mar. 29, 1892 |
| 512,850 | Vandegrift | Jan. 16, 1894 |
| 842,208 | Kirkman | Jan. 29, 1907 |
| 844,390 | Newton | Feb. 19, 1907 |
| 1,978,526 | Eppler | Oct. 30, 1934 |
| 2,162,506 | Jones et al. | June 13, 1939 |
| 2,336,117 | Moschel et al. | Dec. 7, 1943 |
| 2,531,934 | Crose | Nov. 28, 1950 |